United States Patent [19]

Wilkinson, Jr.

[11] Patent Number: 4,498,165
[45] Date of Patent: Feb. 5, 1985

[54] APPARATUS FOR THE CENTERED MOUNTING AND UNMOUNTING ON A DEVICE SPINDLE

[75] Inventor: Richard A. Wilkinson, Jr., Boulder, Colo.

[73] Assignee: Storage Technology Partners II, Louisville, Colo.

[21] Appl. No.: 538,403

[22] Filed: Oct. 3, 1983

[51] Int. Cl.³ .................. G11B 17/00; G11B 17/04
[52] U.S. Cl. .................................. 369/270; 360/97; 360/86; 369/271
[58] Field of Search ............... 369/270, 208, 206, 195, 369/191, 178, 271, 262, 263, 77; 360/97, 86

[56] References Cited

U.S. PATENT DOCUMENTS

| | | | |
|---|---|---|---|
| 2,905,475 | 9/1959 | Cheesebaro | 369/270 |
| 4,068,851 | 1/1978 | Yamamura | 360/97 |
| 4,232,870 | 11/1980 | Imenschot | 369/270 |
| 4,390,979 | 6/1983 | Saito et al. | 369/270 |

FOREIGN PATENT DOCUMENTS 2131886 12/1972 Fed. Rep. of Germany ........ 360/86

Primary Examiner—Charles Frankfort
Assistant Examiner—Thomas P. Matecki
Attorney, Agent, or Firm—Ronald C. Williams

[57] ABSTRACT

A magnetic or optical disk load/unload device for automatically centering and clamping a disk to the spindle of an information storage device. The apparatus is comprised of a toggle arm, a toggle arm rotating device, a support base, a support hub having a centering stem and a concentric annular steel ring disposed on its mating surface, a member for clamping the hub to the support base, a spindle having a centering hole on its mating surface and a concentric magnetic material ring on its mating surface, and a spindle rotating motor. In operation, the toggle arm is rotated from a first bent position causing the support base hub and disk located thereon to advance toward the spindle, the hub slidably retained on the base by a of clamping member activated by a cam assembly. Upon full extension of the toggle arm, the hub and disk are centered on the spindle, clamped to same by the magnetic and steel rings. The toggle arm continues on to a second bent position, causing the support base to retreat from the support hub, the clamping member having been released. At this point the spindle, disk and hub are free to rotate. For unload, the above described procedure is reversed.

2 Claims, 3 Drawing Figures

APPARATUS FOR THE CENTERED MOUNTING AND UNMOUNTING ON A DEVICE SPINDLE

BACKGROUND OF THE INVENTION

The present invention, a disk elevator and clamping means, relates to the field of work piece handling devices, and in particular to information disk loading and unloading apparatus. In the prior art, the loading and unloading of disks to and from spindles is well known, e.g., the loading apparatus used in jukebox record players, as well as the large number of home turntable record changer devices. However, in high density digital information storage devices such as magnetic or optical disk drives, the extremely sensitive nature of the information recording surface has generally led to the use of non-removeable disks or the loading of a plurality of disk into the device in a disk-pack unit. However, as the need for devices having more flexible storage capability has increased, devices having the capability of interchanging disks has increased in importance. Two problems need to be specifically addressed when loading high density digital information recording disks. The first involves the accurate and repeatable centering of the disk on the device disk rotation spindle. Because of the extremely high density data storage rate, radial tracking errors, caused by disk misalignment on the spindle, can be severe. Accordingly, it is necessary to precisely and repeatably center the disk on the device.

In the prior art, clamping the disk to the spindle is taught, see e.g., U.S. Pat. No. 4,340,955, issued to Elliot on July 20, 1982, wherein the disk is simply laid on the platter and then clamped. There has also been teaching wherein centering of the disk on the spindle for rotation is taught, see e.g., U.S. Pat. No. 4,232,870, issued to Iemenschot on Nov. 11, 1980, wherein a magnetic clamping apparatus is disclosed.

The second problem faced is the need to securely clamp the disk onto the spindle after accurate centering. The above mentioned disclosures fall short of this need in that they do not provide a means for the automatic loading of the disk. The means for accurate centering can inhibit secure clamping and secure clamping can inhibit accurate centering. The present invention addresses this problem in that it provides a means for accurately centering the disk on the spindle prior to clamping and thereafter securely clamping the disk to the spindle for rotation.

BRIEF SUMMARY OF THE INVENTION

In the preferred embodiment of the present invention, the load/unload apparatus is comprised of: a spindle rotating means; a spindle, having a concentric tapered center hole for the accurate centering of the disk and a magnet ring disposed on the mating surface of said spindle; a disk support hub, said hub having a centering stem which cooperates with the hole in the spindle for accurately centering the hub with respect to the spindle, and a steel ring deposed on the mating surface of the hub for supporting the disk, the magnet and steel rings cooperating to clamp the hub and therefore the disk to the spindle for rotation, said hub also having an opening in its bottom surface for retaining a hub clamping member therein; a support base, having the hub slidably resting thereon during mounting and unmounting operations, said support base having a center passage through which a hub clamping member can slidably reciprocate, said passage further having a lip for retaining a spring within said passage, and said support base further having a rotatable cam attached thereto for activating the hub clamping member; a hub clamping member, said member clamping the hub to the base during mounting and unmounting operations and allowing the hub to freely rotate during device operation; a toggle arm, the upper end of which is attached to the support base and the lower end attached to a toggle arm rotating means, said toggle arm having a roller located thereon for activation of the cam; and a toggle arm rotating means.

In operation, the disk is automatically placed on the support hub by known disk handling means such as that taught in U.S. patent application Ser. No. 499,750 entitled "Optical Disk Load/Unload Mechanism", assigned to the same assignee as in this application, herein incorporated by reference. The toggle arm support means is thereafter activated causing the toggle arm, which is in initial first bent position, to move toward a straightened position. This causes the support base, the hub and the disk to all advance toward the spindle. In this position, the toggle arm roller and base cam are in a position which allows the spring and hub clamping member to cooperate and retain the hub on the base. When the toggle arm is then in a completely straightened position, the disk, which is resting on the support hub steel ring, comes in contact with the magnetic ring on the spindle, and is magnetically clamped to the spindle between said rings. In this position the cam has been moved by the toggle arm roller to a position which compresses the spring, and causing the clamping member to release the hub from the base. Thereafter, the toggle arm continues movement, toward a second bent position. This results in the support base retreating from the hub, said hub now clamped to the spindle by the magnet and steel rings, with the disk securely clamped between the hub and the spindle. At this point the spindle rotation means is activated and the device operated.

For disk unloading after spindown, the toggle arm rotating means moves the toggle arm from the second bent position to a straightened position causing the support base to come in contact with the support hub, the clamping member moved to a position by the cam which clamps the hub to the base. The toggle arm continues from the straightened position to the original first bent position, pulling the support base, the hub and the disk away from the spindle, unclamping the disk from the spindle. Thereafter, the disk may be either manually or automatically removed from the spindle.

It is an object of this invention to provide a means for automatically centering an information recording disk on a spindle for rotation.

It is another object of the disclosed invention to provide a means for the clamping of an information recording disk onto a spindle for rotation.

It is yet a further object of the disclosed invention to provide a single unit apparatus for the automatic centering and clamping of the information recording disk onto a device spindle.

BRIEF DESCRIPTION OF THE PREFERRED EMBODIMENT

Figure 1:
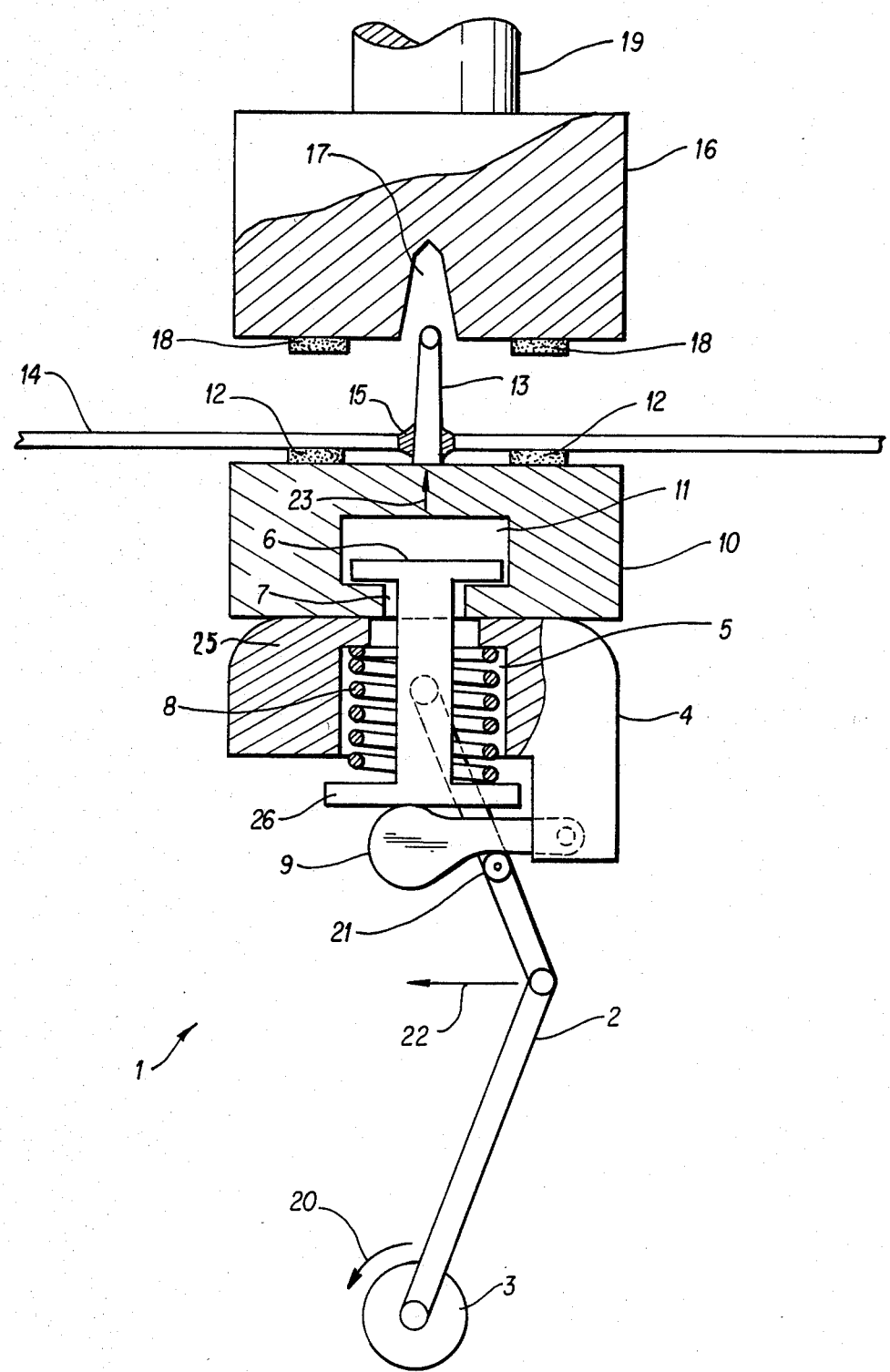
FIG. 1 is a schematic representation of the disclosed invention, showing the disk being moved toward the spindle for clamping.

In FIG. 1, the disk load/unload device 1 is shown with the toggle arm 2 in a first bent position. The toggle arm 2 has its lower end connected to a toggle arm rotating means 3, and its upper end connected to a disk support base 4. The support base 4 has a center passage 5, through which a hub clamping member 6 can reciprocate. The upper portion of the passage 5 has a neck 7 which retains a spring 8 in the passage 5 between the neck 7 and flange 26 on the bottom of the clamping member 6. The support base 4 also has rotatably attached thereon a cam 9 which reciprocates the clamping member 6.

Slidably resting on the support base 4 is the disk support hub 10. The hub 10 has an interior opening 11 in the bottom end for rotatably receiving the clamping member 6, the opening 11 having a lip 25 which cooperates with the upper flange 28 of the clamping member 6 to clamp the hub 10 to the support base 4. Located on the mating surface of the support hub 10 is a concentric annular ring 12 of a ferromagnetic material, such as steel. Concentrically mounted in the center of the mating face of the support hub 10 is a centering stem 13. The disk 14 to be loaded, is mounted to this centering stem 13, and accurately centered by centering collar 15 on the disk 14, resting on the annular steel ring 12. Located above the support hub 10 is the spindle 16. The spindle 16 has, in its mating surface, a tapered concentric hole 17 for accepting the hub centering stem 13, and a concentrically placed magnetic ring 18, having a diameter substantially the same as the steel ring 12. The spindle 16 is attached to a spindle rotating means 19.

In operation, once the disk 14 is manually or automatically loaded onto the support hub 10, the toggle arm rotation means 3 is activated, rotating in direction 20, causing the toggle arm 2 to move from its first bent position toward a straightened position. In this first position, a toggle arm roller 21 allows the cam 9 to be in a downward position which in turn allows the spring 8 to push the clamping member 6 down to retain the hub 10 and the base 4. As shown in FIG. 1, the straightening movement 22 of the toggle arm 2 causes the support base 4, the hub 10 and the disk 14 to all advance in direction 23 toward the spindle 16. During this advancing motion, the clamping member 6 still loosely retains the support hub 10 on the support base 4.

Figure 2:
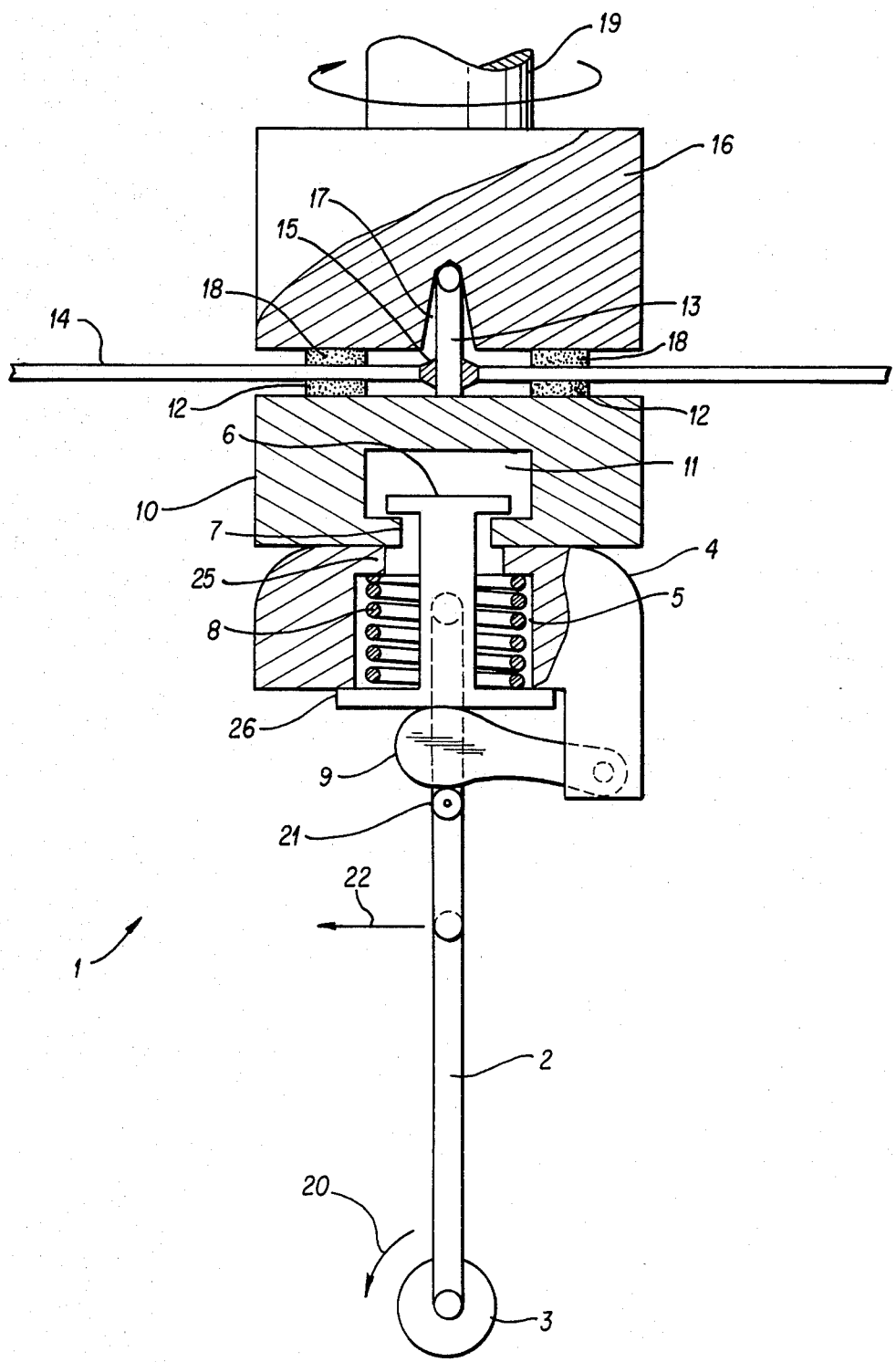
FIG. 2 is a schematic representation of the disclosed invention, showing the disk in its advanced most position.

As shown in FIG. 2, once the toggle arm 2 is in a completely straightened position, the centering stem 13 is fully inserted into the centering hole 17 of the spindle 16, thereby centering the hub 10 and the disk 14 relative to the spindle 16, the hub 10 having slidably moved on the support base 4 for accurate centering. Once the support hub 10 is fully advanced, magnetic contact is made between the magnetic ring 18 on the spindle 16 and the steel ring 12 on the hub 10, magnetically clamping the disk 14 to the spindle 16, between the two rings 12 and 18.

Figure 3:
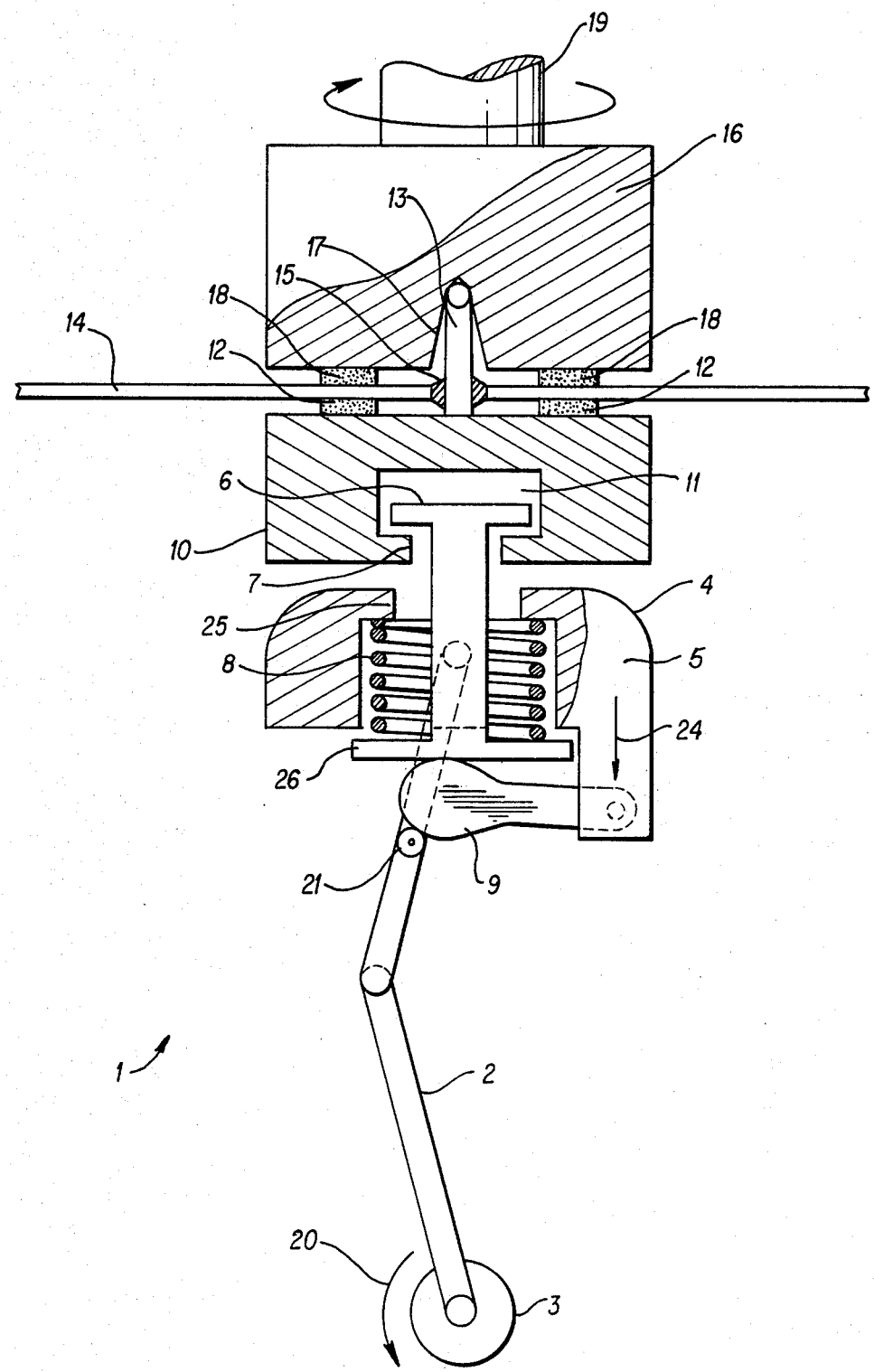
FIG. 3 is a schematic representation of the disclosed invention, showing the disk and hub clamped to the spindle, and the support base retreating from the hub, to allow free rotation of the spindle, disk and hub.

As shown in FIG. 3, the toggle arm rotating means 3 continues the movement 20 of the toggle arm 2 toward a second bent position, causing the support base 4 to move in a retreating direction 24. Once over center the roller 21 causes the cam 9 to move the clamping member 6 upward, releasing the hub 10 from the base. At this point the clamping member 6 having been released by the roller arm 21 and the cam 9 thereby allowing the support hub 10 with the disk 14, to remain clamped to the spindle 16, freeing the support hub 10 and disk 14 for rotation with the spindle 16.

For disk 14 to unload, the procedure is reversed with the toggle arm rotating means 3 activated in the direction opposite to that shown in FIGS. 1, 2 and 3, causing the support base 4 to initially advance, coming in contact with the support hub 10. The clamping member 6 is then activated by the cam 9 and roller arm 21 retaining the support hub 10 on the support base 4, with the toggle arm 2 continuing in the reverse direction, pulling the support hub 10 and disk 14 away from the spindle 16 for unloading.

I claim:

1. An apparatus for the rotational centered mounting of a disk having a center hole, said apparatus comprised of:

a disk elevating means for raising and lowering a disk hub and a support base toward and away from a spindle, said elevating means having reciprocating movement;

a spin motor;

a spindle, rotatably attached to the spin motor, said spindle having a tapered hole at the center of rotation of a mating surface of the spindle, and a ring magnet concentrically disposed on the mating surface of the spindle;

a disk support hub, said hub slidably resting upon a support base, said hub having, a steel ring concentrically disposed on a mating surface of the hub, said hub having a tapered centering stem for the centered mounting of the disk thereon, said stem being located in the center of the mating surface of the hub, and said hub having an interior opening in a bottom surface thereof, the interior opening having a lip for rotatably retaining an upper flange of a clamping member;

a disk support base, said base being attached to the elevating means and having a center passage for reciprocative movement of the clamping member, said passage having an upper neck for retention of a spring;

said clamping member having an upper and a lower flange, the lower portion of the clamping member being disposed in the center passage of the base, such that said lower flange can thereby cooperate with the upper neck of the base to retain the spring in the base passage, and the upper portion of the flange being disposed in the hub interior opening, such that said upper flange can thereby cooperate with the lip on the hub to selectively clamp the hub to the base when the elevator means is in an unactivated position, but which releases the hub from the base when the elevating means is activated moving the clamping member to a raised position;

a spring, said spring providing a force for clamping the hub to the base, said spring being disposed around the clamping member in the passage on the base between the upper neck on the base and the lower flange on the clamping member;

a cam for reciprocatively actuating the clamping member, said cam being rotatably attached to the base and in contact with the bottom of the clamping member; and means for activating the cam in coordination with the disk elevating means;

whereby when the elevating means is unactivated and in a lowered position, the spring forces the clamping member downward, causing the upper flange of the clamping member to cooperate with the lip of the hub to clamp the hub to the base; and whereby when the elevating means is activated to the move upward, the hub is raised by the elevating means and the centering stem engages the tapered hole in the spindle, causing the hub to move laterally relative to the spindle, thereby centering the hub and the disk with respect to the spindle; and whereby as the base is raised, the cam is activated, raising the clamping member relative to the base and hub so as to unclamp the hub from the base; and whereby at the uppermost position of the elevating means movement, the magnet ring on the spindle and the steel ring on the hub magnetically clamp the disk to the spindle; and whereby when the elevating means is then lowered slightly, the hub with the disk clamped thereto separates from the base to allow the centered rotation of the hub and the disk with the spindle.

2. An apparatus as recited in claim 1 wherein the elevating means is comprised of:

a toggle arm rotating means; and a toggle arm having a center joint, the upper end of the toggle arm being rotatably attached to the base, said base having a fastener for that purpose, and the lower end of the toggle arm being attached to the toggle arm rotating means, said toggle arm further having a roller, said roller being attached to the toggle arm so as to be in contact with the cam for activating said cam in coordination with the rotation of the toggle arm;

whereby as the rotating means is activated, the toggle arm moves from a first bent position to a straightened position, thereby raising the base, hub and disk to a position of maximum extension so as to facilitate clamping of the hub and the disk to the spindle, the toggle arm thereafter continuing movement to a second bent position, lowering the base, so that the clamped hub and disk are free to rotate with the spindle.

* * * * *